Aug. 27, 1935.    F. W. KERNS ET AL    2,012,567
APPARATUS FOR REMOVING SOLIDS FROM FLUIDS
Filed Nov. 14, 1932    3 Sheets-Sheet 1

INVENTORS.
Frank W. Kerns,
Warren Egbert.
BY
Townsend and Loftus
ATTORNEYS.

Aug. 27, 1935.   F. W. KERNS ET AL   2,012,567
APPARATUS FOR REMOVING SOLIDS FROM FLUIDS
Filed Nov. 14, 1932   3 Sheets-Sheet 2
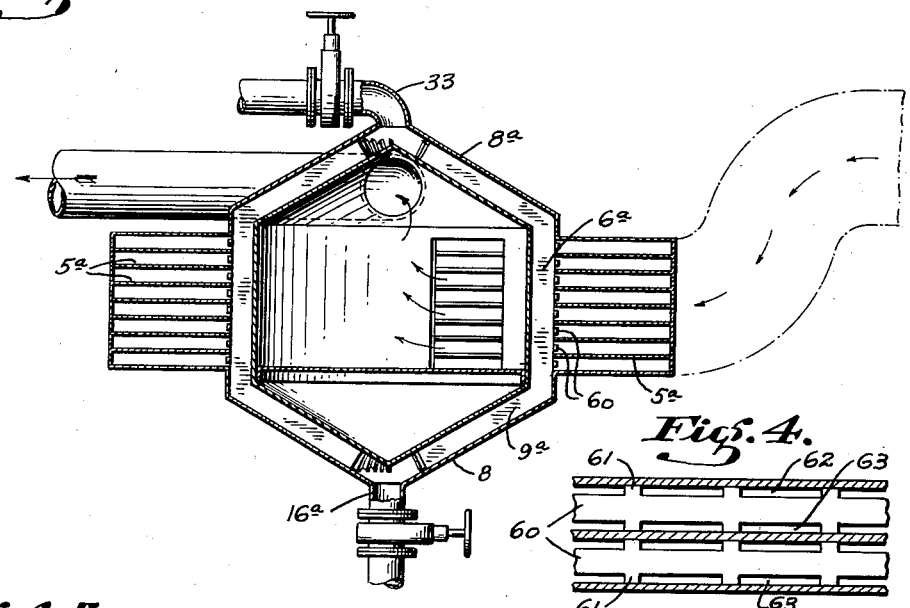
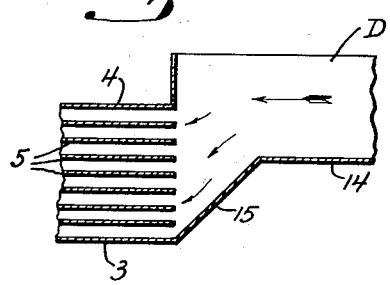
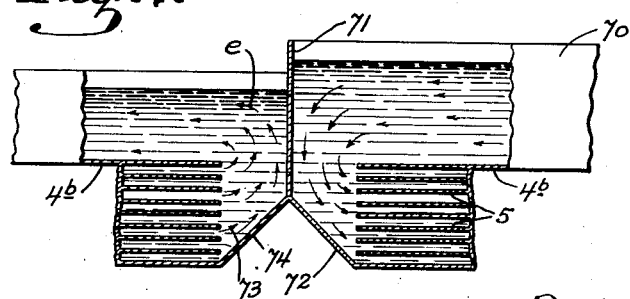
INVENTORS.
Frank W. Kerns,
Warren Egbert.
BY
Townsend and Loftus.
ATTORNEYS.

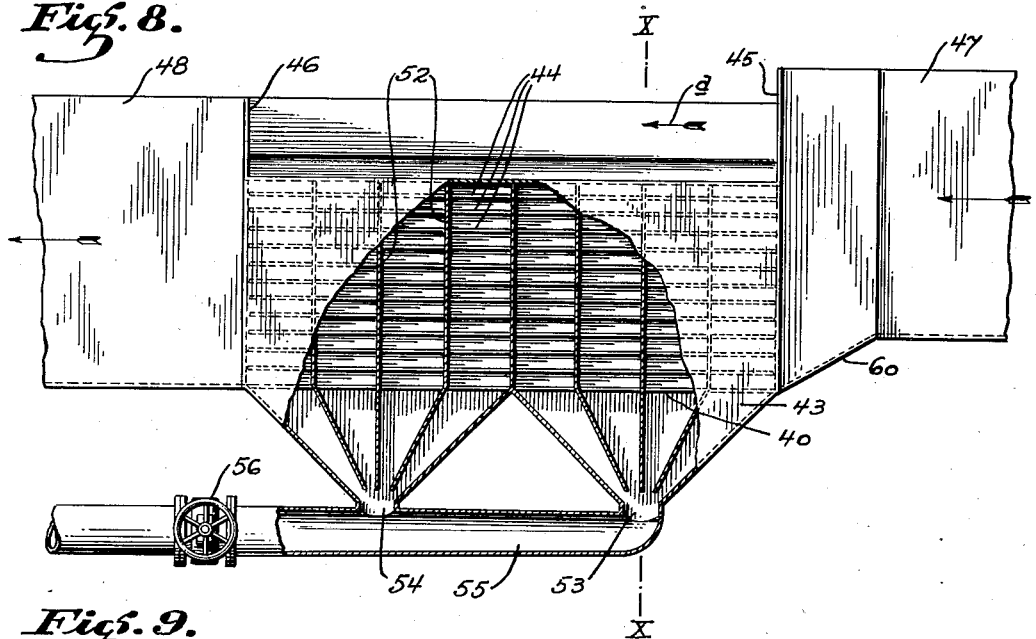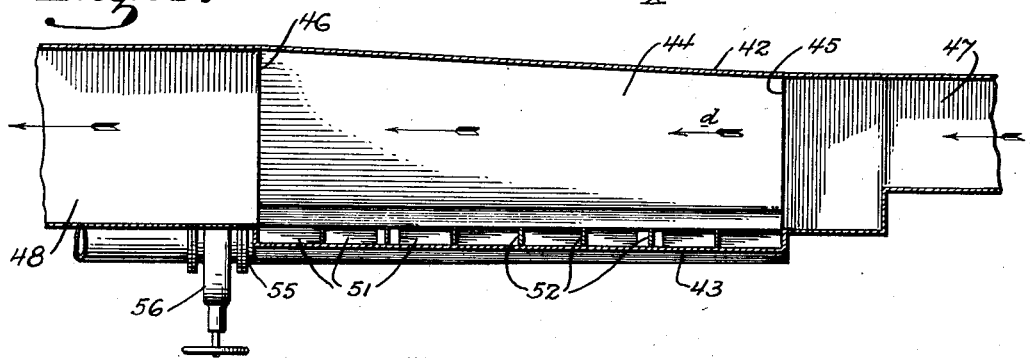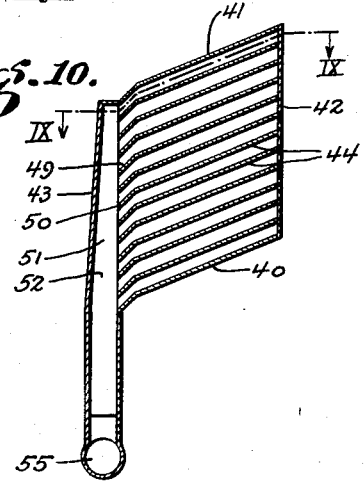

Patented Aug. 27, 1935

2,012,567

UNITED STATES PATENT OFFICE 2,012,567

APPARATUS FOR REMOVING SOLIDS FROM FLUIDS

Frank W. Kerns, Berkeley, and Warren Egbert, Oakland, Calif.

Application November 14, 1932, Serial No. 642,574

15 Claims. (Cl. 209—211)

This invention relates to an apparatus for removing solids from fluids and particularly to improvements on the apparatus disclosed in our former patent entitled "Method and means for removing sand and the like from fluids", Patent Number 1,880,185, issued September 27, 1932.

The object of the present invention is to generally improve and simplify the construction and operation of an apparatus of the character described; to provide an apparatus in which solids may be removed regardless of the fact that their specific gravity may be greater or less than that of water or the medium in which they are contained; to provide an apparatus in which centripetal action, friction and gravity are employed to separate solids from fluids; to provide an apparatus in which continuous removal of solids from a flowing stream may be obtained; to provide an apparatus which is so constructed that it lends itself to substantially any capacity required; to provide an apparatus in which the flowing stream carrying the solids to be removed is divided into a number of superposed shallow streams whereby solid matter will be given an opportunity to quickly settle to the bottom of the shallow streams where it will be removed by centripetal action; to provide an apparatus wherein the velocity of a flowing stream containing matter to be separated may be readily regulated during its flow through the apparatus; and further, to provide an apparatus in which solid matter carried by the flowing stream may be uniformly distributed so as to prevent overloading of any part of the apparatus.

The invention is shown by way of illustration in the accompanying drawings, in which—

Fig. 3 is a section similar to Fig. 1 showing that form of the apparatus employed when water or like fluids contain matter which floats.

Fig. 4 is an enlarged detail view showing the rings 60 placed between the inner edges of the plates of Figs. 3 and 4.

Fig. 5 is a vertical section taken on line V—V of Fig. 2.

Fig. 6 is a diagrammatic view illustrating cross flow in a curved conduit.

Fig. 7 is a vertical section showing a modified inlet and outlet for the type of apparatus shown in Figs. 1 and 2.

Fig. 8 is a side elevation showing a modified form of the apparatus, said view being partially broken away.

Fig. 9 is a plan view in section taken on line IX—IX of Fig. 10.

Fig. 10 is a cross section taken on line X—X of Fig. 8.

Figure 1:
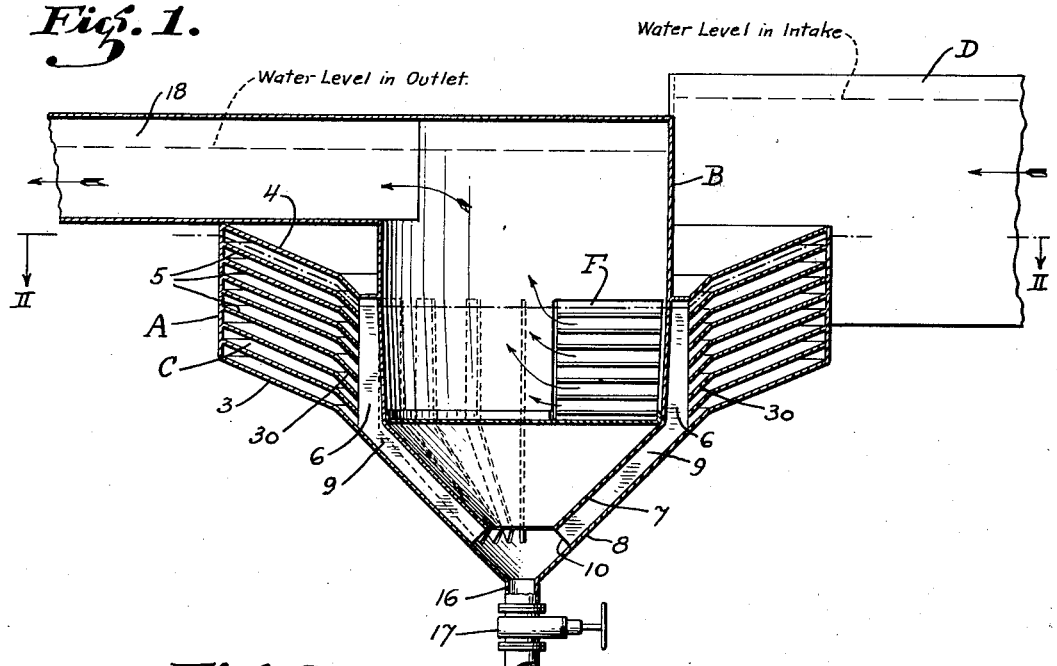
Fig. 1 is a central vertical section of the apparatus.
Figure 2:
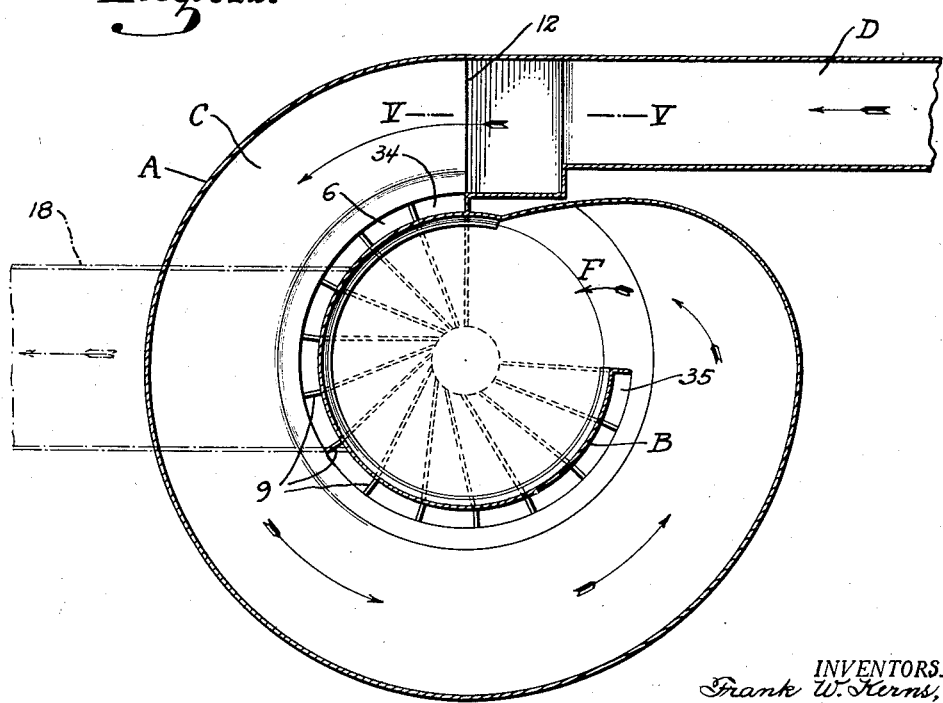
Fig. 2 is a horizontal cross section taken on line II—II of Fig. 1.

Referring to the drawings in detail, and particularly Figs. 1 and 2, A indicates an outer casing substantially circular in cross section, and B an inner casing which is also substantially cylindrical in cross section. Formed between these casings is a conduit or passage C to which water is continuously admitted at one end through a flume or other conduit, such as indicated at D, and from the opposite end of which the water discharges into the inner cylinder B at the point F. This passage has a bottom plate 3 and a top plate 4, and between these plates are a plurality of spaced superposed plates 5 whereby the stream of water flowing through the passage is divided horizontally into a plurality of shallow streams.

The main function of the present apparatus is that of separating solid matter from a flowing stream of water or like fluid. The solid matter may have a specific gravity greater than that of water or the fluid containing the same, and in that case, the solids will settle and will be removed. The apparatus shown in Figs. 1 and 2 is particularly intended for separating solids having a specific gravity greater than the fluids containing the same. Fig. 3 shows an apparatus in which fluid containing floating and settling solid matter may be separated from a continuously flowing stream of water, fluid, or the like, but this will be later described.

In Figs. 1 and 2 an annular chamber 6 is formed between the inner edges of the plates 5 and the wall of the inner cylinder or casing B. This chamber will, during operation, contain a body of substantially non-flowing water and the solid matter separated from the continuously flowing stream will enter this body of water and will settle therein. The bottom of the inner casing or cylinder B is cone-shaped, as shown at 7, and the bottom 3 of the conduit is extended to form a cooperating cone-shaped bottom section 8. A plurality of vertically disposed baffle plates 9 are positioned between the inner edges of the plates 5 and the inner wall of the conduit, or in other words, the exterior surface of the casing or cylinder B, and these baffle plates are extended down under the cone-shaped bottom 7 to the point indicated at 10. The baffle plates serve two functions, first that of preventing any flowing or swirling motion in the body of substantially non-flowing water, or in other words the chamber 6, and secondly that of preventing by-passing of water from one side of the conduit to the other through the chamber 6. This feature will be later described.

The conduit D, whether it be a pipe, a flume, or otherwise, is connected with the inlet of the apparatus at the point indicated at 12. Where water carries sand, silt, or the like, there is a possibility that as the water flows through the conduit D a considerable portion of the solid matter will settle and run along the bottom of the conduit D. Where conditions of that character are encountered, the bottom of the conduit D is elevated, as shown at 14, see Fig. 5, and where the conduit connects with the inlet the bottom section is dropped abruptly or pitched on a steep angle, as indicated at 15, so that any sand flowing along the floor or bottom of the conduit will be thrown into suspension and will be uniformly distributed between the superposed plates 5. As the stream of water delivered by the conduit D enters the inlet 12 of the apparatus, it is immediately divided by the superposed plates 5 into a number of shallow streams. The sand or other solid matter carried by the water is at the same time uniformly distributed between the plates and as the water flows through the circular conduit C between the plates, the sand or solid matter contained will settle on the surfaces of the plates where centripetal action will act on the sand or solid matter and cause it to move inwardly toward the inner edges of the plates, where it will drop off the inner edges into the annular chamber 6, or in other words enter the body of substantially non-flowing water where it is permitted to settle and to be discharged through the pipe or conduit 16. The flow through said conduit may be intermittent or it may be continuous; for instance, by providing a valve 17 which is partially opened so as to permit a small stream of water and the sand collected to continuously discharge. As the water passes between the plates in the conduit C, separation of the solid matter continues, and if the conduit is of proper length, all solid matter would be removed by the time the water reaches the discharge end F. The water will here enter the inner cylinder or casing B and it will rise therein and finally discharge through a conduit or outlet 18, this outlet being placed at an elevation slightly below the delivery conduit D so that gravital flow of water will be insured and velocity through the conduit controlled. The difference in head between the discharge outlet 18 and the inlet conduit D is diagrammatically illustrated by the dotted lines in Fig. 1, said lines indicating that the flume or inlet conduit D is at an elevation slightly above that of the discharge 18, in fact, the elevation maintained being only slightly in excess of the friction head produced by the apparatus as a comparatively low velocity through the conduit C is desirable.

The broad idea of separating solid matter from water or like fluids by centripetal action has been clearly disclosed in our former patent referred to, nevertheless, it may be briefly stated that where water flows through a circular or curved conduit, such as here shown, there is a cross or lateral flow established, as indicated by the arrows see Fig. 6; the lower half of the water flowing in the direction of the arrows indicated, and the upper half flowing in the direction of the arrows indicated. Hence, if water is passed through a conduit of this character, solid matter will settle to the bottom plate, indicated at 23 in Fig. 6, or rise to the upper plate 24, and as the lateral flow of the current is in the direction of arrows $a$ and $b$ the solid matter will work toward the inner edges of the plates 23 and 24, and if these plates are arranged in an apparatus, such as here illustrated, the solid matter will enter the chamber 6 containing the body of substantially non-flowing water, and as such will either rise or settle therein. In the present apparatus the plates 5 are closely spaced and actual practice has determined that the spacing may be one-quarter of an inch or less. Such spacing promotes separation of solid matter from water. For instance, if a solid particle had to settle a distance of one foot before reaching a surface where it could be acted upon by centripetal action, it might pass through the apparatus before it would settle but where it has only a quarter of an inch to rise or settle it is fairly certain that it will engage one of the plates 23 or 24 and thus be acted upon by the lateral flowing currents $a$ or $b$ so as to be discharged into the chamber 6.

It is the lateral flowing currents $a$ and $b$ which account for centripetal action, and while the force of these currents is sufficient to separate a greater proportion of solid matter contained in a flowing stream of water, or like fluid, advantage has been taken of the gravitational forces; that is, it will be noted in Fig. 1 that the plates 5 are laterally inclined in a downward direction. This, however, can only be done where the water contains matter having a specific gravity greater than that of water but where matter having a specific gravity less than water is encountered the plates should be laterally inclined in an upward direction. Hence, where only heavy material is being removed the plates are inclined laterally in a downward direction, as shown in Fig. 1, this being an advantage as separating action is not only obtained by the lateral flowing currents $a$ and $b$ referred to as centripetal action, but separation is also promoted by gravitational action when the plates are inclined.

By referring to Fig. 1, it will be noted that the inner edges of the plate are bent at an angle, as shown at 30, which is greater than the lateral angle of the main body of the plates. The flange or angular extension on the inner edge of each plate, indicated at 30, serves the following function. In actual practice it has been found that eddy currents are sometimes set up between the baffle plates 9 and that where a grain of sand is approaching the edge of the plate the eddy current will sometimes repulse the centripetal force or lateral currents $a$ and $b$ whereby the solid matter tends to be thrown back from the inner edges of the plates, but by bending the flange 30 on the inner edges of the plates the eddy currents have little force compared to the force of gravity at the inner edges of the plates. That is, as a grain of sand travels toward the inner edges of the plates it strikes the abrupt incline 30 and the gravitational force has thus greater action and the grain of sand will not be repulsed or thrown back by an eddy current that may exist, hence the inclined flanges 30 are of considerable importance.

Where fluid or water containing solid matter having a specific gravity greater than water, and also contains matter having a specific gravity less than water, the form of apparatus shown in Fig. 3 is employed. In this case the plates, indicated at 5$a$, are horizontally disposed. The apparatus is constructed identical to that shown in Fig. 1, with the exception that a cone-shaped top 8$a$ similar to the cone-shaped bottom 8 is employed. That is, solid matter having a specific gravity greater than water will enter the chamber 6a and settle downwardly between the baffle plates to be discharged by the pipe 16a, while matter having a specific gravity less than water will rise upwardly through the chamber 6a and will be discharged through pipe 33. In this structure it is not possible to incline the plates 5 as it would favor separation of one substance and hinder separation of the other. It is for this reason that the plates are horizontally disposed. If floating matter only is encountered the cone-shaped bottom sections may be entirely eliminated and the plates may be laterally inclined in an upward direction.

It should also be noted that rings 60 are placed between the inner edges of the plates, see Figs. 3 and 4. These rings are supported between the plates by upper and lower lugs 61 and upper and lower slots 62 and 63 are thus formed through which solid matter enters the chamber 6a, either to settle or rise as the case may be. These rings are of considerable importance as they substantially prevent the formation of eddy currents between the vertically disposed baffle plates 9a.

By again referring to Figs. 1 and 2, it will be noted that the vertically disposed baffle plates 9 extend downwardly under the cone-shaped bottom section 7 of the inner cylinder or casing B. This is important as it forms a baffle to prevent water from the conduit C passing through the chamber 6 and over to the other side of the conduit; for instance, if water entering the inlet 12 should pass inwardly and downwardly through the chamber 6 at the point indicated at 34 it could make a short cut through this chamber and come up at the point indicated at 35. Such short-cutting or by-passing of the water from one part of the conduit to the other is, however, prevented by the extensions on the baffle plates. That is, by carrying the baffle plates down under the cone-shaped bottom to the point indicated at 10, they become closely spaced at the lower ends and as such choke or resist any flow of water between them; the spacing, however, is sufficient to permit sand or other solids to pass between and thus escape through the pipe 16.

By referring to Fig. 2, it will be noted that the spacing between the lower ends of the baffle plates is fairly close at the entrance and that the spacing increases toward the discharge end. The importance of this feature will be as follows: The pressure and velocity at the entrance end are considerably greater than at the discharge end due to friction loss. It has also been stated that the solids entering the chamber 6 may be continuously removed from the lower part of the chamber and that this is accomplished by leaving valve 17 partially open. If the valve is partially open there will be a slow but continuous down flow of water in chamber 6, and if the spacing between the baffle plates 9 was equal, the greatest flow would be at the point of highest pressure and velocity, hence if a uniform downward flow through the annular chamber is desired it is accomplished by the gradual increase in spacing between the lower ends of the baffle plates, the spacing being the least where the pressure and velocity are the greatest and then gradually increasing as the pressure and velocity decrease. By this method of spacing the lower ends of the baffle plates a uniform downward flow or velocity is maintained in the settling chamber.

In actual practice it will be understood that the water or other fluid medium containing solids to be removed enters at the point 12. At this point the stream of fluid is divided into a number of superposed shallow streams. These streams pass through the conduit C at a comparatively low velocity and finally enter the inner cylinder B through the opening F; the water here rises upwardly and finally discharges through the pipe or conduit 18, all solid matter being removed by the combined action of centripetal and gravital action while the water is passing over and between the plates. The solid matter removed enters the chamber 6 and is continuously or intermittently discharged through the pipe 16. The capacity of an apparatus of this character is substantially unlimited as practically any capacity can be obtained by increasing the distance between the bottom and top plates 3 and 4, respectively, and by proportionately increasing the number of interposed plates 5; hence a large flow of water may be taken care of in a comparatively small apparatus. Separation of solids from water, or a similar fluid, depends first of all upon gravity action and it is for this reason that the stream flowing through the apparatus is divided into a series of shallow streams so that the solid matter will have only a short distance to settle. After it has settled it is acted upon by the lateral currents, or in other words centripetal action, and if the plates are inclined the solid matter will be additionally acted upon by gravitational force; hence the separating action is rapid and is another reason why a comparatively compact apparatus may be employed to handle large volumes of fluid. Where water entering carries great quantities of sand, silt, or the like, it was found that the sand would settle near the entrance ends of the plates and form bars. This has been avoided in the present instance by gradually widening the conduit, or in other words by gradually increasing the width of the plates 5 between the inlet and the outlet. By doing this a comparatively high velocity is maintained at the entrance ends of the plates and as the water continues its flow between the plates, the velocity gradually decreases, the lowest velocity being obtained at the exit end of the plates or where the water discharges through the opening F into the center of the casing; thus if the water is heavily laden with solids a higher velocity is desired at the entrance end so that the heavy material will gradually drop out and be more uniformly distributed between the plates during the passage of the stream through the conduit. Where plates of gradually increasing width are employed, either the inner or the outer wall of the conduit will be spiral in shape. In Fig. 2, the outer casing or wall A of the conduit is shown as being of slightly spiral form.

In Figs. 8 to 10, a modified form of the apparatus is disclosed. In this instance 40 indicates the bottom of the conduit, 41 the top, 42 the outer wall of the conduit, and 43 the inner wall of the conduit. Plates 44 are introduced between the top and bottom plates 40 and 41 of the conduit and they are closely spaced so as to divide the stream running through into a number of shallow streams. The plates are laterally inclined throughout their length and they extend from the point indicated at 45, which is the inlet end, to the point 46, which is the outlet end, see Fig. 8. The inlet is supplied with water, or other fluid medium, to be treated by means of a flume or a similar conduit 47 which is substantially identical to that illustrated at D in Fig. 2. The discharge end is also connected with a pipe or conduit, such as shown at 48, and the passage formed between the flumes 47 and 48 is clearly shown in Fig. 9. The plates are laterally inclined, as shown in Fig. 10, and their inner edges are flanges, as shown at 49, to form inclined edges having a greater angle than the laterally disposed plates. The flanges 49 terminate at the point 50 and a settling chamber 51 is thus formed between the inner edges of the plates and the inner wall 43 of the conduit. Vertically disposed baffle plates 52 are also employed in this instance and they serve two functions, to-wit, that of preventing flow and swirling motion of the water in the settling chamber, and preventing by-passing. The lower portion of the settling chamber is connected at one or more points, such as shown at 53 and 54, with a discharge conduit 55 and the flow through said conduit may be regulated by valve 56 or any other suitable means.

The apparatus shown in the present instance does not utilize centripetal action in the separation of the solids from the water, the separation being secured in the present instance by settling of the solid matter on the upper surfaces of the plates 44 and as the plates are laterally inclined and the water or other fluid medium travels in the direction of arrow d the solid particles will roll down the inclined surfaces and finally over the abrupt flanges 49. It will thus enter the settling chamber and settle therein, being finally delivered into the conduit 55 and discharged therefrom. The apparatus accordingly functions as a gravity separator and may be used in conjunction with the apparatus shown in Figs. 1 and 2, that is, where water carrying a considerable proportion of heavy sand and silt is being treated it may be advisable to get rid of most of the heavy sand before the water enters the apparatus shown in Figs. 1 and 2; hence by placing the apparatus shown in Figs. 8 and 9 in front of the inlet of the apparatus shown in Figs. 1 and 2, the major portion of the heavy sand may be removed thus leaving the silt and remaining matter to be removed by the apparatus wherein centripetal action functions. If heavier sand and like material are the only material encountered, the entire separating action may be continued in the modified form of apparatus shown in Figs. 8 to 10. In this apparatus it may also be advisable to construct the inlet in the manner shown in Fig. 5, that is, the bottom of the flume or conduit 47 is maintained at an elevation with relation to the bottom plate 40 but at a point adjacent the inlet 45. The bottom plate of the flume is placed on a steep angle, as shown at 60, thus permitting any sand which is settled along the bottom of the flume to be uniformly distributed between the plates as the stream enters between the same.

In actual operation the water entering through the flume 47 will immediately be divided into a number of shallow streams by the plates 44. The heavier sands or other solids contained will rapidly settle against the upper surfaces of the plates and as these are inclined laterally, as shown in Fig. 10, the particles will tend to roll downwardly over the plates and as such will discharge into the settling chamber 51 and will finally be discharged through the conduit 55; the discharge through the conduit 55 being preferably continuous by maintaining the valve 56 sufficiently open to continuously discharge and carry off the solid matter delivered to the conduit 55. The plates employed preferably increase in width from end to end, as shown in Fig. 9, being narrowest at the inlet and widest at the outlet. In Fig. 9 the cover plate is shown as removed and the uppermost of the plates 44 is thus shown. This view clearly illustrates the increasing width of the plates. This is important as it maintains fairly high velocity at the inlet end and a low velocity at the discharge end, thus permitting solid matter entering to gradually drop out as the stream is passing between the plates, thus causing a uniform distribution and removal of the solids and positively preventing clogging and overloading of the inlet ends of the plates. The apparatus is substantially identical to that disclosed in Figs. 1 and 2. It employs an outer wall 42, an inner wall 43, a bottom section 40, and a top or cover section 41. A conduit is thus formed through which the water to be treated is passed and the conduit carries the plates 44, where separation takes place, and a settling chamber is formed between the inner edges of the plates and the inner wall 43 of the conduit. In fact, the only substantial difference between the two forms of apparatus disclosed is that in Figs. 8 to 10 the stream flow is in a linear direction, while in Figs. 1 and 2 the stream flow is a curved path. The lateral flowing currents described in conjunction with Figs. 1 and 2, see Fig. 6, are not produced where a linear path is employed, hence gravity action to produce separation is solely depended upon.

By referring to Fig. 2 of the drawings, it will be noted that considerable separating space is lost due to the space required by the discharge end F of the plates. This lost space may be materially reduced by arranging the inlet and outlet of the apparatus as shown in Fig. 7. In this instance, 70 indicates the flume whereby water is delivered to the apparatus. This overlies the uppermost plate 4b and ends in an upright or like wall 71. This wall terminates in a sloping plate 72, and this directs the water inwardly between the superposed plates, indicated at 5. The water then flows around the apparatus between the plates 5 and finally reaches the discharge point indicated at 73. It here strikes an upwardly inclined plate 74 and the vertical plate 71 and then flows in the direction of arrow e, and as such discharges away from the apparatus at a point above the uppermost plate 4b. By arranging the inlet and outlet in this manner considerable space is conserved and greater capacity for separation will be obtained.

While certain features of the present invention are more or less specifically described, we wish it understood that various changes may be resorted to within the scope of the appended claims. Similarly, that the materials and finish of the several parts employed may be such as the manufacturer may decide, or varying conditions or uses may demand.

Having thus described our invention, what we claim and desire to secure by Letters Patent is:—

1. An apparatus for separating solid matter from a continuously flowing stream of water, comprising a curved conduit adapted for continuous gravital flow of water to be treated, said conduit having a bottom and inner and outer spaced walls forming a curved passage with an inlet and an outlet for the continuously flowing water, a plurality of superposed plates extending from the inlet to the outlet of the conduit, said plates dividing the stream horizontally into a plurality of shallow streams and said plates constituting frictional retarding surfaces, said plates having a width less than the conduit to form an annular settling chamber between the inner wall of the conduit and the inner edges of the plates, said chamber being in communication with the spaces between the plates, and containing a body of substantially non-flowing water whereby solid matter separated from the continuously flowing stream by centripetal action on the plates will enter the non-flowing water and settle therein.

2. An apparatus for separating solid matter from a continuously flowing stream of water, comprising a curved conduit adapted for continuous gravital flow of water to be treated, said conduit having a bottom and inner and outer spaced walls forming a curved passage with an inlet and an outlet for the continuously flowing water, a plurality of superposed plates extending from the inlet to the outlet of the conduit, said plates dividing the stream horizontally into a plurality of shallow streams and said plates constituting frictional retarding surfaces, said plates having a width less than the conduit to form an annular settling chamber between the inner wall of the conduit and the inner edges of the plates, said chamber being in communication with the spaces between the plates and containing a body of substantially non-flowing water whereby solid matter separated from the continuously flowing stream by centripetal action on the plates will enter the non-flowing water and settle therein, and means for removing the settled matter.

3. An apparatus for separating solid matter from a continuously flowing stream of water, comprising a curved conduit adapted for continuous gravital flow of water to be treated, said conduit having a bottom and inner and outer spaced walls forming a curved passage with an inlet and an outlet for the continuously flowing water, a plurality of superposed plates extending from the inlet to the outlet of the conduit, said plates dividing the stream horizontally into a plurality of shallow streams and said plates constituting frictional retarding surfaces, said plates having a width less than the conduit to form an annular settling chamber between the inner wall of the conduit and the inner edges of the plates, said chamber being in communication with the spaces between the plates, and containing a body of substantially non-flowing water whereby solid matter separated from the continuously flowing stream by centripetal action on the plates will enter the non-flowing water and settle therein, and means for continuously removing the settled matter.

4. An apparatus for separating solid matter from a continuously flowing stream of water, comprising a curved conduit adapted for continuous gravital flow of water to be treated, said conduit having a bottom and inner and outer spaced walls forming a curved passage with an inlet and an outlet for the continuously flowing water, a plurality of superposed plates extending from the inlet to the outlet of the conduit, said plates dividing the stream horizontally into a plurality of shallow streams, and said plates increasing in width throughout their length to gradually decrease the velocity of the shallow streams during their flow between the plates, and an annular settling chamber formed between the inner edges of the plates and the inner wall of the conduit and in communication with the spaces between the plates, said chamber containing a body of substantially non-flowing water whereby solid matter separated from the continuously flowing stream by centripetal action on the plates will enter the non-flowing water and settle therein.

5. An apparatus for separating solid matter from a continuously flowing stream of water, comprising a curved conduit adapted for continuous gravital flow of water to be treated, said conduit having a bottom and inner and outer spaced walls forming a curved passage with an inlet and an outlet for the continuously flowing water, a plurality of superposed plates extending from the inlet to the outlet of the conduit, said plates dividing the stream horizontally into a plurality of shallow streams, a flume connected with the inlet of the conduit to deliver water, together with the solids to be removed, to the conduit, means interposed between the flume and the inlet for uniformly distributing the solids to the superposed plates, and an annular settling chamber formed between the inner edges of the plates and the inner wall of the conduit, said chamber being in communication with the spaces between the plates and said chamber containing a body of substantially non-flowing water whereby solid matter is separated from the continuously flowing stream and by centripetal action on the plates will enter the body of non-flowing water and settle therein.

6. An apparatus for separating solid matter from a continuously flowing stream of water, comprising a curved conduit adapted for continuous gravital flow of water to be treated, said conduit having a bottom and inner and outer spaced walls forming a curved passage with an inlet and an outlet for the continuously flowing water, a plurality of superposed plates extending from the inlet to the outlet of the conduit, said plates dividing the stream into a plurality of shallow streams, said plates being substantially horizontally disposed throughout their length but tilted laterally to form angularly disposed surfaces with the inner edges of the plates being the lowest, and an annular settling chamber formed between the inner edges of the plates and the inner wall of the conduit and in communication with the spaces between the plates, said chamber containing a body of substantially non-flowing water whereby solid matter separated from the continuously flowing stream by centripetal action on the plates will enter the non-flowing body of water and settle therein.

7. An apparatus for separating solid matter from a continuously flowing stream of water, comprising a curved conduit adapted for continuous gravital flow of water to be treated, said conduit having a bottom and inner and outer spaced walls forming a curved passage with an inlet and an outlet for the continuously flowing water, a plurality of superposed plates extending from the inlet to the outlet of the conduit, said plates dividing the stream into a plurality of shallow streams, said plates being substantially horizontally disposed throughout their length but tilted laterally to form angularly disposed surfaces with the inner edges of the plates being the lowest, a flange on the inner edge of each plate and bent at an angle greater than the lateral angular position of the plates, and an annular settling chamber formed between the flanged edges of the plates and the inner wall of the conduit and in communication with the spaces between the plates, said chamber containing a body of substantially non-flowing water whereby solid matter is separated from the continuously flowing stream by centripetal action on the plates will enter the non-flowing body of water settled therein.

8. An apparatus for separating floating and settling solids from a continuously flowing stream of fluid, comprising a curved conduit adapted for continuous gravital flow of the fluid to be treated, said conduit having a bottom and an inner and outer spaced walls forming a curved passage with an inlet and an outlet for the continuously flowing fluid, a plurality of superposed plates extending from the inlet to the outlet of the conduit, said plates dividing the stream of fluid horizontally into a plurality of shallow streams and said plates constituting upper and lower frictional retarding surfaces, an annular chamber formed between the inner edges of the plates and the inner wall of the conduit and in communication with the spaces between the plates, said chamber containing a body of substantially non-flowing fluid whereby solid matter separated from the continuously flowing stream by centripetal action on the plates will enter the non-flowing body of fluid and where settling matter will settle and collect and where floating matter will rise, and means for removing the floating matter and the settling matter.

9. An apparatus for separating solid matter from a continuously flowing stream of water, comprising a curved conduit adapted for continuous gravital flow of water to be treated, said conduit having a bottom and inner and outer spaced walls forming a curved passage with an inlet and an outlet for the continuously flowing water, a plurality of superposed plates extending from the inlet to the outlet of the conduit, said plates dividing the stream horizontally into a plurality of shallow streams and said plates constituting frictional retarding surfaces, said plates having a width less than the conduit to form an annular settling chamber between the inner wall of the conduit and the inner edges of the plates, said chamber being in communication with the spaces between the plates and containing a body of substantially non-flowing water whereby solid matter separated from the continuously flowing stream by centripetal action on the plates will enter the non-flowing water and settle therein, and a plurality of vertically disposed baffle plates in the settling chamber to prevent swirling of the water therein.

10. An apparatus for separating solid matter from a continuously flowing stream of water, comprising a curved conduit adapted for continuous gravital flow of water to be treated, said conduit having a bottom and inner and outer spaced walls forming a curved passage with an inlet and an outlet at opposite ends of the conduit for continuously flowing water, said bottom increasing in width through a portion of its length to gradually decrease the velocity of the flowing stream as it approaches the outlet, a housing connected with the bottom of the conduit and having a settling chamber formed therein, an opening formed in the bottom portion of the conduit adjacent the inner wall of the conduit and forming communication between the conduit and the settling chamber, said chamber having means for maintaining a body of substantially non-flowing water whereby solid matter separated from the continuously flowing stream by centripetal action on the bottom portion of the conduit will enter the non-flowing water and settle therein.

11. An apparatus for separating floating and settling matter from a continuously flowing stream of fluid, comprising a curved conduit adapted for continuous gravital flow of the fluid to be treated, said conduit having a top, a bottom and inner and outer spaced walls forming a curved passage with an inlet and an outlet at opposite ends of the conduit for the continuously flowing water, a plurality of vertically disposed baffle plates surrounding the inner wall of the conduit, said baffle plates forming a body of substantially non-flowing fluid whereby solid matter separated from the continuously flowing stream by centripetal action on the top and bottom portion of the conduit will enter the non-flowing body of fluid and where settling matter will settle and collect and where floating matter will rise, and means for removing the floating matter and the settling matter separately.

12. An apparatus for separating solid matter from a continuously flowing stream of water, comprising a substantially circular conduit adapted for continuous gravital flow of water to be treated, said conduit having a bottom and inner and outer spaced walls forming a substantially circular passage with an inlet and an outlet for the continuously flowing water, a plurality of superposed plates extending from the inlet to the outlet of the conduit, said plates dividing the stream horizontally into a plurality of shallow streams and said plates constituting frictional retarding surfaces, said plates having a width less than the conduit to form an annular settling chamber between the inner wall of the conduit and the inner edges of the plates, said chamber being in communication with the spaces between the plates and containing a body of substantially non-flowing water whereby solid matter separated from the continuously flowing stream by centripetal action on the plates will enter the non-flowing body of water and settle therein, and means for preventing flow of water from one side of the conduit through the chamber containing the substantially non-flowing body of water to the other side of the conduit.

13. An apparatus for separating solid matter from a continuously flowing stream of water, comprising a substantially circular conduit adapted for continuous gravital flow of water to be treated, said conduit having a bottom and inner and outer spaced walls forming a substantially circular passage with an inlet and an outlet for the continuously flowing water, a plurality of superposed plates extending from the inlet to the outlet of the conduit, said plates dividing the stream horizontally into a plurality of shallow streams and said plates constituting frictional retarding surfaces, said plates having a width less than the conduit to form an annular settling chamber between the inner wall of the conduit and the inner edges of the plates, said chamber being in communication with the spaces between the plates and containing a body of substantially non-flowing water whereby solid matter separated from the continuously flowing stream by centripetal action on the plates will enter the non-flowing body of water and settle therein, and a plurality of baffle plates disposed in the chamber, said baffle plates being closely spaced at their lower ends to prevent the water in the conduit from flowing from one part of the conduit to another part thereof through the chamber containing the substantially non-flowing body of water.

14. An apparatus for separating solid matter from a continuously flowing stream of water, comprising a substantially circular conduit adapted for continuous gravital flow of water to be treated, said conduit having a bottom and inner and outer spaced walls forming a substantially circular passage with an inlet and an outlet for the continuously flowing water, a plurality of superposed plates extending from the inlet to the outlet of the conduit, said plates dividing the stream horizontally into a plurality of shallow streams and said plates constituting frictional retarding surfaces, said plates having a width less than the conduit to form an annular settling chamber between the inner wall of the conduit and the inner edges of the plates, said chamber being in communication with the spaces between the plates and containing a body of substantially non-flowing water whereby solid matter separated from the continuously flowing stream by centripetal action on the plates will enter the non-flowing body of water and settle therein, an outlet in communication with the annular settling chamber through which a continuous flow of a small volume of water is maintained to cause continuous discharge of solid matter entering the settling chamber, and means for maintaining a slow uniform downward flow of water throughout the annular settling chamber to supply the outlet.

15. An apparatus for separating floating and settling solids from a continuously flowing stream of fluid, comprising a curved conduit adapted to continuous gravital flow of the fluid to be treated, said conduit having a bottom and an inner and outer spaced walls forming a curved passage with an inlet and an outlet for the continuously flowing fluid, a plurality of superposed plates extending from the inlet to the outlet of the conduit, said plates dividing the stream of fluid horizontally into a plurality of shallow streams and said plates constituting upper and lower frictional retarding surfaces, an annular chamber formed between the inner edges of the plates and the inner wall of the conduit, rings placed between the inner edges of the plates and spaced therefrom to form upper and lower slots whereby communication is maintained between the spaces between the plates and the settling chamber, said chamber containing a body of substantially non-flowing fluid whereby solid matter separated from the continuously flowing stream by centripetal action on the plates will enter the non-flowing body of fluid and where settling matter will settle and collect and where floating matter will rise, and means for removing the floating matter and the settling matter.

FRANK W. KERNS.
WARREN EGBERT.